(12) United States Patent
Okamoto

(10) Patent No.: US 7,216,662 B2
(45) Date of Patent: May 15, 2007

(54) FLOW CONTROL APPARATUS

(75) Inventor: Noriyuki Okamoto, Okazaki (JP)

(73) Assignee: JTEKT Corporation, Osaka (JP)

( * ) Notice: Subject to any disclaimer, the term of this patent is extended or adjusted under 35 U.S.C. 154(b) by 274 days.

(21) Appl. No.: 11/067,673

(22) Filed: Mar. 1, 2005

(65) Prior Publication Data
US 2005/0194043 A1 Sep. 8, 2005

(30) Foreign Application Priority Data
Mar. 5, 2004 (JP) ............................. 2004-062765

(51) Int. Cl.
*G05D 7/01* (2006.01)
(52) U.S. Cl. ..................... 137/115.05; 137/115.07; 137/115.15
(58) Field of Classification Search ........... 137/115.05, 137/115.15, 115.07, 115.13, 115.23, 115.19, 137/115.18, 115.08
See application file for complete search history.

(56) References Cited

U.S. PATENT DOCUMENTS

| 3,426,785 | A | * | 2/1969 | Brady et al. | ............ | 137/115.05 |
| 4,247,311 | A | | 1/1981 | Seibert et al. | ................. | 55/163 |
| 5,580,817 | A | * | 12/1996 | Kortge | .................... | 137/115.15 |
| 6,041,807 | A | * | 3/2000 | Honaga et al. | ......... | 137/115.05 |
| 6,328,535 | B1 | * | 12/2001 | Brighton et al. | ....... | 137/115.15 |

\* cited by examiner

*Primary Examiner*—Stephen M. Hepperle
(74) *Attorney, Agent, or Firm*—Oblon, Spivak, McClelland, Maier & Neustadt, P.C.

(57) ABSTRACT

In a flow control apparatus, a fluid pressure is introduced from downstream of a metering orifice to a rear room of a spool while a relief valve in the spool is assembled in advance. A front section of a relief valve sub-assembly is press fitted to a hole provided on the spool and is opening to rear room of the spool so that a receiving room of a valve body in a relief valve casing communicates to a bypass path. A communicating path provided in a rod communicates to the rear room of the spool through outside of the relief valve sub-assembly. The relief valve casing is received in a receiving hole provided in the spool and a cylindrical room between the relief valve casing and the receiving room is used as a part of a communicating path.

6 Claims, 1 Drawing Sheet

FLOW CONTROL APPARATUS

INCORPORATION BY REFERENCE

The present application claims priority under 35 U.S.C. §119 to Japanese Patent Application No. 2004-062765, filed on Mar. 5, 2004. The contents of that application are incorporated herein by references in their entirety.

BACKGROUND OF THE INVENTION

1. Field of the Invention

The present invention relates to a flow control apparatus for supplying fluid oil discharged from an oil pump to a hydraulic operating apparatus like power steering device through a metering orifice and returning excess fluid to the oil pump through a bypass path.

2. Description of the Related Art

In a prior art of a flow control apparatus, there has been known Japanese laid-open patent publication No. 2002-168358. This publication discloses a flow control apparatus for supplying operating fluid discharged from an oil pump to a hydraulic operating device through a metering orifice and returning excess fluid to the oil pump according to fluid pressure difference between upstream and downstream of the metering orifice. The disclosed flow control apparatus comprises a hollow rod formed on a spool and a metering orifice formed between an opening of a union and the rod passing through the opening of the union to introduce operating fluid pressure of downstream of the metering orifice to a pressure room located at opposite end of the spool through a communicating path in the rod. According to this prior art, a communicating path in a flow control valve housing is not required because fluid pressure of downstream of the metering orifice is introduced to a pressure room located at opposite end of the spool through a communicating path in the rod. Therefore, the flow control valve housing can be become small in size, and drilling process of the flow control valve housing and plugging operation, for example, press fitting a ball to the drilling hole for fluid sealing can be eliminated. As a result, assembling efficiency of the flow control apparatus can be improved, and reliability can be improved also due to no operating fluid leakage to outside of the flow control apparatus.

Such a flow control device requires a relief pressure mechanism to protect the oil pump from overload by reducing fluid pressure in the room at opposite end of the spool and retracting of the spool when fluid pressure in a hydraulic operating apparatus reaches a predetermined threshold pressure.

However, in the prior art described above, the relief pressure mechanism described above requires complex structure, for example, a ring shape seat valve and so on, because the rod providing a communicating path of fluid pressure between downstream of the metering orifice and the room at opposite end of the spool is arranged in an area from downstream of the metering orifice to the room at opposite end of the spool along center line of the spool. Further, a relief valve sub-assembled in advance can not be used.

Therefore, assembling process of flow control apparatus becomes complex, and it results increasing in cost because relief pressure setting is necessary to be performed after assembling of the flow control apparatus.

SUMMARY OF THE INVENTION

It is an object of the present invention relating flow control apparatus to solve above problems by sub-assembling in advance of a relief pressure valve arranged in a spool and arranging a fluid pressure communicating path to a rear room of the spool at outside of the relief pressure valve in an axial area of the relief pressure valve.

It is second object of the present invention relating flow control apparatus to provide a pressure communicating path with a cylindrical room provided between a relief pressure valve casing and a receiving hole provided on a spool. The receiving hole is provided at rear side of the spool and diameter thereof is larger than outer diameter of the relief pressure valve casing. A press fitting hole is provided at center of bottom face of the receiving hole and front section of the relief pressure valve casing is press fitted to the press fitting hole. At least a part of relief pressure valve sub-assembly is received in the receiving hole and the cylindrical room is provided between the receiving hole and the relief pressure valve sub-assembly.

It is third object of the present invention relating flow control apparatus to provide a pressure communicating path to the cylindrical room by a communicating groove provided at outer circumference of front section of the relief pressure valve casing that is press fitted to the press fitting hole of the spool.

It is fourth object of the present invention relating flow control apparatus to provide a pressure communicating path to the cylindrical room by a communicating path provided in the spool.

It is fifth object of the present invention relating flow control apparatus to provide a spool having a recess portion whose outer diameter is smaller than outer diameter of the spool. The recess portion is located at least an area in axial direction where front section of the relief pressure valve sub-assembly is press fitted to the spool that is slidably inserted to flow control valve hole.

It is sixth object of the present invention relating flow control apparatus to provide a relief pressure valve casing whose outer diameter of front section is smaller than other section.

The flow control apparatus according to the present invention mainly comprises a housing providing of a flow control valve hole and a bypass path formed at intermediate portion of axial direction of the flow control valve hole and communicating to the flow control valve hole, a spool slidably inserted into the flow control valve hole to open and close fluid communication between a fluid introducing room connecting to the flow control valve hole and the bypass path and forming a rear room of the spool and a front room of the spool where operating fluid is introduced from an oil pump and forced to a side of the front room of the spool to close communication to the bypass path, an opening formed coaxially with the flow control valve hole on a member bodily provided on the housing at he side of the front room side of the spool and communicating the front room of the spool to an outlet of the housing, a rod formed coaxially with the spool and forming a metering orifice between the opening and the rod by passing though the opening with a clearance, a communicating path passing through in the rod in axial direction and forming a path communicating the rear room of the spool to the outlet of the housing, a relief pressure mechanism to protect the oil pump from overload by relieving high pressure in the rear room of the spool to the bypass path; wherein the relief pressure mechanism comprising a relief pressure valve casing and a valve body elastically forced to a valve seat face formed bodily with the valve seat member and is assembled in advance as a relief pressure valve sub-assembly, the front section of opposing to a side of the valve seat member of the relief pressure valve casing is press fitted into the press fitting hole opening to the rear room of the spool so that a room receiving a valve body in the relief pressure valve casing communicates to the bypass path, and the communicating path communicates to the rear room of the spool via outside of the relief pressure valve sub-assembly.

According to the present invention described above, assembling process of a flow control apparatus can be simplified and a relief pressure of the relief pressure valve sub-assembly can be set in advance. Therefore, production cost of the flow control apparatus can be reduced. Further, a communicating path is communicated to the rear room of the spool via outside of the relief pressure valve sub-assembly, therefore, the rear room of the spool can be communicated to a side of an outlet of a housing while the relief pressure valve sub-assembly is provided in the relief pressure valve casing in advance.

The second aspect of the present invention is to provide a pressure communicating path by a cylindrical room provided between a relief pressure valve casing and a receiving hole provided in a spool. The receiving hole is provided at rear side of the spool and diameter thereof is larger than outer diameter of the relief pressure valve casing. A press fitting hole is provided at center of bottom face of the receiving hole and the front section of the relief pressure valve casing is press fitted to the press fitting hole. At least a part of relief pressure valve sub-assembly is received in the receiving hole and provides the cylindrical room between the receiving hole and the relief pressure valve sub-assembly. Therefore, the spool receiving the relief pressure valve sub-assembly can be shortened length of the receiving hole, and the flow control apparatus can be reduced in size.

The third aspect of the present invention is that a communicating path is communicated to cylindrical room via a communicating groove provided on outer circumference of a front section of a relief pressure valve casing. The communicating groove is easy to be formed, thus production cost can be reduced.

The fourth aspect of the present invention is that a communicating path is communicated to a cylindrical room via a communicating path formed in a spool. The communicating path can be shortened in length, thus production cost can be reduced.

The fifth aspect of the present invention is that a recess portion whose outer diameter is smaller than outer diameter of other portion of a spool is provided on outer circumference of a spool. The recess portion is provided at least axial area of a front section of the relief pressure valve casing press fitted to a press fitting hole of the spool. After press fitting of the front section of the relief pressure valve casing to the press fitting hole of the spool, increasing of outer diameter of the spool corresponding to press fitting portion due to press fitting distortion may occur. Also, a possibility of bad influence to spool sliding due to reduction of a clearance between outer circumference of the spool and a flow control valve hole may occur. However, according to the present invention, outer diameter of the spool may not be increased with a function of the recess portion while press fitting of the front section of the relief pressure valve sub-assembly, thus possibility of bad influence to sliding of the spool by reduction of a clearance between the spool and the flow control valve hole, because recess portion is provided with smaller outer diameter than other portion.

The sixth aspect of the present invention is that outer diameter of a front section of a relief pressure valve casing is smaller than other section of the relief pressure valve casing. According to the present invention, outside wall thickness where the front section of the relief pressure valve casing is press fitted can be increased with amount of small diameter of the front section of the relief pressure valve casing. Therefore, increasing of outer diameter of the spool by press fitting distortion can be suppressed, thus possibility of bad influence to spool sliding by press fitting distortion can be further reduced.

BRIEF DESCRIPTION OF THE DRAWING FIGURES

DESCRIPTION OF THE PREFERRED EMBODIMENT

Figure 1:
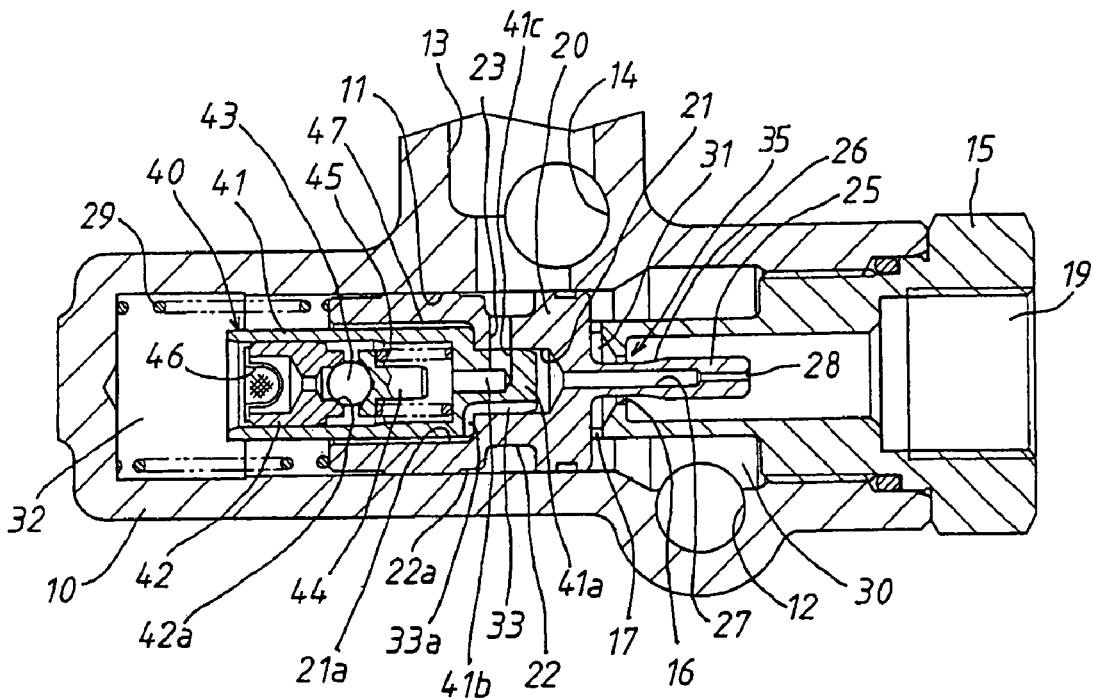
FIG. 1 illustrates a sectional view of first embodiment of a flow control apparatus.

A first embodiment of the present invention will be described in FIG. 1. A flow control apparatus mainly comprises a housing 10, a spool 20 slidably inserted into a flow control valve hole 11 formed in the housing 10 and a relief pressure valve sub-assembly 40 provided in the spool 20 to protect an oil pump from overload. The housing 10 is formed bodily with a housing of an oil pump (not shown). The flow control valve hole 11 of long and slender shape is formed in the housing 10 and one end is opened. A union 15 is fluid tightly screwed to the opening of the flow control valve hole 11. An opening 16 is formed on the union 15 coaxially with the flow control valve hole 11 at a side of protruding to the flow control valve hole 11. An outlet 19 is provided on the union 15 at opposite end of the opening 16. A bypass path 13 is provided at intermediate portion of the flow control valve hole 11 in axial direction and the bypass path communicates to an inlet side of the oil pump. A fluid oil introducing room 30 is provided and communicates to an outlet of the oil pump via a fluid oil supplying path 12 at further side of the union 15 than the bypass path 13. A fluid oil inlet 14 communicating to a reservoir (not shown) is provided on the bypass path 13 at adjacent portion to the flow control valve hole.

The spool 20 is inserted into the flow control valve hole 11 slidably within predetermined distance to open and close communication between the bypass path 13 and the fluid oil introducing room 30. A front room 31 of the spool is provided between the spool 20 and an inner side of the union 15 providing the opening 16. A rear room 32 of the spool is provided between the spool 20 and a closed end of the flow control valve hole 11. The spool 20 is forced to the union 15 side by a spring 29 put between a bottom face 11 of the flow control valve hole 11 of the rear room 32 side and the spool 20. In unoperating condition shown in FIG. 1, the spool 20 is stopped by a contact with an inner side of the union 15 providing the opening 16 at one end and closes communicating between the fluid oil introducing room 30 and the bypass path 13. An opening 17 is provided on an annual protrusion of an inner end of the union 15 contacting with the front section of the spool 20 to communicate between the fluid oil introducing room 30 and the front room 31 of the spool 20 via an appropriate communicating area.

A receiving hole 21a is coaxially provided whose outer diameter is slightly larger than outer diameter of a relief pressure valve casing 41 of a relief pressure sub-assembly 40 described later at a side of the rear room 32 of the spool 20. A press fitting hole 21 is provided at a center of a bottom face of the receiving hole 21a. An annual groove 22 is provided on outer circumference of the spool 20 in a slightly narrower area than the receiving hole 21 in axial direction and a communicating path 23 is provided to communicate the receiving hole 21 to the annual groove 22 in radial direction. Further, a recess portion 22a is provided on outer circumference of the spool 20 slidably inserted into the flow control valve hole 11. An outer diameter of the recess portion is smaller than outer diameter of the spool 20. The recess portion is provided at an area from an end of the annual groove 22 toward to the rear room 32 of the spool 20 exceeding a bottom face of the receiving hole 21a in axial direction. The area is where at least the front section 41a of the relief pressure valve casing 41 is press fitted.

A rod 25 that is long and slender shape and is provided as protruding coaxially with the spool 20 on front section of the spool 20 contacting inner end of the union 15. A metering orifice 35 is provided between the rod 25 and the opening 16 provided on union 15. The rod 25 is passing through the opening 16 of the union 15 with a clearance. At intermediate portion of the rod 25, a tapered member 26 is provided to change a path area of the metering orifice 35 according to movement in axial direction of the spool 20. A communicating path 27 is provided within the rod 25 in axial direction. An inner end of the communicating path 27 opens to center of the press fitting hole 21. At an opposite end opening to the fluid outlet 19 side of the union 15, a small diameter damping orifice 28 is provided.

A relief pressure valve sub-assembly 40 comprises a relief pressure valve casing 41 that is press fitted to the spool 20, a valve seat member 42, a valve body 43 and a spring 45 forcing the valve body 43 to a valve seat face 42a of the valve seat member 42. The relief pressure valve casing 41 is bottomed cylinder shape and a front section 41a is provided at the bottom side. The front section 41a is cylindrical shape and outer diameter thereof is smaller than outer diameter of the relief pressure valve casing 41. Further, the front section 41a protrudes coaxially from the bottom side of the relief pressure valve casing 41. A communicating path 41b is provided from bottom side to a half way in axial direction in the front section 41a. A communicating path 41c is provided in radial direction from adjacent portion of the communicating path 41b. A communicating groove 33 is provided at opposite side of the communicating path 41c in axial direction on outer circumference of the front section 41a of the relief pressure valve casing 41 and a communicating groove 33a is provided in radial direction at root step portion of the front section 41a.

The seat valve member 42 is fluid tightly press fitted into an inner face opposite side to the front section 41a of the relief pressure valve casing 41. The seat valve face 42a is provided on inner end face of the seat valve member 42. The valve body 43 is comprised of a steel ball provided in the relief pressure valve casing 41 is elastically forced to the valve seat face 42a by the spring 45 put between inner bottom face of the relief pressure valve casing 41 and a spring seat member 44. A filter 46 is provided to remove a contamination in operating fluid at opposite side of the valve seat face 42a of the valve seat member 42.

The relief pressure valve sub-assembly 40 is positioned in phase so that the communicating path 41c of the relief pressure valve casing 41 meets the communicating path 23 of the spool 20. The front section 41a of the relief pressure valve casing 41 is press fitted to the press fitting hole 21 of the spool 20. In this condition, the fluid outlet 19 of the union 15 provided at downstream of the metering orifice 35 and the rear room 32 of the spool 20 communicate each other via the damping orifice 28, communicating path 27, communicating grooves 33, 33a and a cylindrical room 41 provided between the receiving hole 21a of the spool 20 and outer circumference of the relief pressure valve casing 41. Every communicating path or groove 28, 27, 33, 33a and 47 is arranged outside of the relief pressure valve sub-assembly 40. Further, a room receiving the valve body 43 in the relief pressure valve casing 41 communicates to the bypass path 13 via communicating paths 41b, 41c, 23. As described above, inside room of the relief pressure valve sub-assembly 40 communicates to the bypass path 13, and operating fluid can be allowed to be flown from the rear room 32 of the spool 20 to the bypass path by an operation of the valve body 43 forced to the valve seat face of the valve seat member 42. Although an inner end of the communicating path 27 of the rod 25 is opened to center of the press fitting hole 21, the communicating paths 27 and 41b do not communicate because the communicating path 41b of the relief pressure valve casing 41 does not pass through the front section 41a.

Next, an operation of the first embodiment described above will be explained. In unoperating condition, the spool 20 is forced to contacts to inner end of the union 15 by the spring 29, and closes the communicating between fluid introducing room 30 communicating to the flow control valve hole 11 and the bypass path 13. After the oil pump operates, operating fluid introduced from the fluid supplying path 12 to the fluid introducing room 30 is flown to a hydraulic equipment like power steering device from the fluid outlet 19 via the opening 17, the front room 31 of the spool 20 and the metering orifice 35. A fluid pressure in the fluid introducing room 30 and the front room 31 of the spool 20 that are upstream of the metering orifice 35 force the spool 20 toward opposite direction of a force of the spring 29. On the contrary, a load pressure of the hydraulic equipment forces the spool 20 toward same direction of a force of the spring 29 by a fluid pressure introduced to the rear room 32 of the spool 20 via communicating paths 28, 27, 33, 33a and 47.

When operation fluid volume gradually increases in proportion to gradually increasing of the revolution speed of the oil pump, pressure difference between upstream and downstream of the metering orifice, that is, pressure difference loaded between both sides of the spool 20 increases. At the time, the spool is retracted gradually against to the force of the spring 29 because the force forcing the spool 20 toward the rear room 32 increases. The operating fluid volume supplied to the hydraulic equipment is increased in proportion to increasing of revolution speed of the oil pump by retracting of the spool 20 till communication between the fluid introducing room 30 and the bypass path 13 is opened. However, when the spool 20 is retracted to a predetermined position, the communication between the fluid introducing room 30 and the bypass path 13 is opened and excess fluid becomes to be returned to the oil pump from the fluid introducing room 30 via the bypass path 13, thus supply volume of operating fluid to the hydraulic equipment becomes predetermined volume. In this first embodiment, a tapered member 26 is provided at intermediate portion of the rod 25 in axial direction to reduce an area of communicating path of the metering orifice 35 corresponding to the retracting of the spool 20, thus a characteristic of operating fluid volume to the hydraulic equipment reduces by the tapered member 26 in proportioning to increase of revolution speed of the oil pump can be obtained.

When load pressure is increased by a steering operation of a power steering apparatus or the like and exceeds a predetermined pressure, abnormally increased fluid pressure in the rear room 32 of the spool 20 is released to the bypass path 13 through the relief pressure valve sub-assembly. Fluid pressure in the rear room 32 of the spool 20 is reduced and the spool 20 retracts against to the force of spring 29, then communicating area between the fluid introducing room 30 and the bypass path 13 is increased. Therefore, abnormally increased pressure in the outlet 19 is reduced and the oil pump can be protected from overload.

According to the first embodiment of the present invention described above, assembling process of a flow control apparatus can be simplified, because a relief pressure mechanism provided in a spool 20 to protect an oil pump from overload is provided as a relief pressure sub-assembly 40 in advance and a front section of a relief pressure valve casing 41 provided at opposite side of a seat valve member 42 of the relief pressure valve sub-assembly 40 is press fitted to a press fitting hole 21 opening to a rear room 32 of a spool 20. Also, production cost of the flow control apparatus can be reduced by setting in advance of relief pressure of the relief pressure valve sub-assembly. Further, since a communicating path 27 provided on a rod 25 is communicated to the rear room 32 of the spool 20 through outside of the relief pressure valve sub-assembly 40, protecting the oil pump from overload can be achieved by communicating paths between a fluid outlet 19 of a housing 10 and a rear room 32 of the spool 20 while the relief pressure sub-assembly 40 is assembled in advance and is provided in the spool 20.

Furthermore, in the first embodiment of the present invention, since a communicating path between the communicating path 27 and a cylindrical room 47 is provided by a communicating path provided on outer circumference of the front section 41a of the relief pressure valve casing 41 and a communicating path 33a is provided on root step portion of the front section 41a, such communication paths 33, 33a are easy to be machined from outside of the relief pressure valve casing 41, thus production cost can be reduced.

When the front section 41a of the relief pressure valve casing 41 is press fitted to the press fitting hole 21 of the spool 20 as the first embodiment, there may be a possibility of a bad influence to sliding of the spool 20 in a flow control valve hole due to increasing of outer diameter of the spool 20 at press fitting portion by press fitting distortion resulting reduction of clearance between the flow control valve hole 11 and outer circumference of the spool 20. However, on the spool 20 of the present embodiment, a recess portion 22a whose outer diameter is smaller that outer diameter of the spool 20 is provided on an area in axial direction where the front section 41a of the relief pressure valve sub-assembly 40 is press fitted. Therefore, outer diameter of the spool 20 is not increased by press fitting of the front section 41a of the relief pressure valve sub-assembly and a bad influence to sliding of the spool 20 due to reduction of clearance between the flow control valve hole 11 and outer circumference of the spool 20 may not occur.

Further, in the present embodiment described above, outer diameter of the front section 41a of the relief pressure valve casing 41 is smaller than outer diameter of a portion where a seat valve member 42 and a spring 45 and so on are provided. Therefore a wall thickness of outside of the press fitting hole 21 can be increased due to small outer diameter of the front section 41a of the relief pressure valve casing 41. Also, rigidity around the recess portion 22a is increased as a result. Then increasing of outer diameter due to press fitting distortion around the recess portion 22a can be suppressed. Furthermore, bad influence to sliding of the spool 20 due to press fitting distortion can be further reduced. However, the present invention is not limited to application described above, the outer diameter of the front section 41a of the relief pressure valve casing 41 may be same as outer diameter of other portion of the relief pressure valve casing 41. In this case, an annual groove 22 provided on outer circumference of the spool 20 needs to be eliminated and the recess portion 22s needs to be provided on wider area in axial direction than an area where press fitting of the front section 41a of the relief pressure valve casing 41. In the present embodiment described above, a steel ball is used as a valve body 43 in the relief pressure valve sub-assembly, other shape of valve body, for example, mushroom shape may be used as a valve body. Such shape of valve body does not require a spring seat 44.

In the present embodiment described above, a rod 25 with tapered member 26 passing through an opening 16 provided on a union 15 to reduce fluid volume supply to a power steering device or the like in proportioning to increase of revolution speed of an oil pump is described. Instead of a rod with tapered member, a straight shape rod without tapered member may be used for constant fluid volume supply to a power steering device or the like.

Further, in the present invention described above, communicating paths 33, 33a to introduce fluid pressure of downstream of the metering orifice 35 to the rear room 32 of the spool 20 are provided on the relief pressure valve casing 41 of the relief pressure valve sub-assembly 40. It is needless to say that such communicating paths may be provided on the spool 20 to obtain same effect.

Next, second embodiment will be described. In the second embodiment, constructions that a relief pressure valve sub-assembly 40A is press fitted without requiring positioning in phase to a spool 20A and a rod 25A as a separate member is press fitted to the spool 20A are different from the first embodiment. Therefore, the differences will be mainly described. In the second embodiment of the present invention, a press fitting hole 21 provided on center of a bottom face of the spool 20A communicates to an annular groove 22 through a communicating path 23 in radial direction at front section of the press fitting hole 22. A passing through communicating path 41d is provided on front section 41a of a relief pressure valve casing 41A of the relief pressure valve sub-assembly 40A. when the front section 41a of the relief pressure valve casing 41A is press fitted to the press fitting hole 21 of the spool 20A, a receiving room of a valve body 43 in the relief pressure valve casing 41A communicates to the bypass path 13 via a communicating path 41d, front section of the press fitting hole 21 and a communicating path 23.

Figure 2:
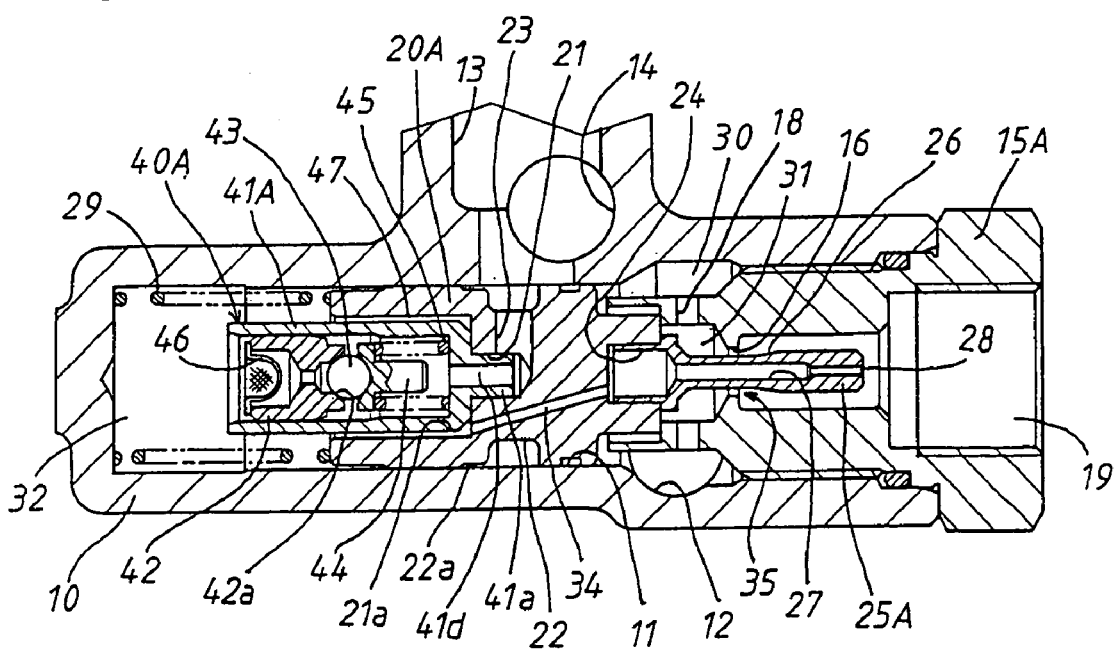
FIG. 2 illustrates a sectional view of second embodiment of a flow control apparatus.

A cylindrical concave portion 24 is provided on center of front end of the spool 20A locating at side of a union 15A. A bottom face of the cylindrical concave portion 24 communicates to outer area in radial direction of a bottom face of the receiving hole 21a via a communicating path 34 not intersecting with the press fitting hole 21 provided in the spool 20A. A rod 25A is coaxially fixed to the spool 20A by a cylindrical portion provided at root of the rod 25A fluid tightly press fitted to the cylindrical concave portion 24. By the construction described above, the outlet 19 of the union 15A of downstream of the metering orifice 35 communicates to the rear room 32 of the spool 20A via the damping orifice 28, the communicating path 27, the communicating path 34 and the cylindrical room 47. Every of the communicating path is provided at outside of the relief pressure valve sub-assembly. In unoperating condition shown in FIG. 2, a front section of the spool 20A is stopped by contact with inner end of the union 15A, and the fluid introducing room 30 communicates to the front room 31 of the spool 20A via a communicating path 18 provided on adjacent portion of inner end of the union 15A.

In the second embodiment of the present invention, assembling process of a flow control apparatus can be simplified, because a relief pressure mechanism provided in a spool 20A to protect an oil pump from overload is provided as a relief pressure sub-assembly 40A in advance and a front section of a relief pressure valve casing 41A of the relief pressure valve sub-assembly 40A is press fitted to a press fitting hole 21 opening to a rear room 32 of a spool 20A. Also, production cost of the flow control apparatus can be reduced by setting in advance of relief pressure of the relief pressure valve sub-assembly. Further, since a communicating path 27 provided on a rod 25A is communicated to the rear room 32 of the spool 20A through outside of the relief pressure valve sub-assembly 40A, protecting the oil pump from overload can be achieved by communicating paths between a fluid outlet 19 of a housing 10A and a rear room 32 of the spool 20A while the relief pressure sub-assembly 40A is assembled in advance and provided in the spool 20A. Furthermore, since the relief pressure valve sub-assembly 40A is received in a receiving hole 21a provided at side of the rear room 32 of the spool 20A and the cylindrical room 47 provided between the relief pressure valve casing 41A and the receiving hole 21a is used as a part of communicating path between the communicating path 27 and the rear room 32 of the spool 20A, total length of the spool 20A providing the relief pressure valve sub-assembly 40A can be shortened, therefore, size of the flow control apparatus can be reduced.

Furthermore, the technological components described in this specification and illustrated in the drawings can demonstrate their technological usefulness independently through various other combinations which are not limited to the combinations described in the claims made at the time of application. Moreover, the art described in this specification and illustrated in the drawings can simultaneously achieve a plurality of objectives, and is technologically useful by virtue of realizing any one of these objectives.

What is claimed is:

1. A flow control apparatus comprising:
   a housing providing a flow control valve hole and a bypass path communicating to intermediate portion in axial direction of said flow control valve hole;
   a spool slidably inserted in axial direction into said flow control valve hole to open and close communicating between a fluid introducing room communicating to said flow control valve hole and said bypass path, providing a rear room of said spool and a front room of said spool where operating fluid is introduced from an oil pump, and forced toward a side of said front room of said spool to close communicating to said bypass path;
   an opening provided as coaxially with said flow control valve hole on a member provided bodily on said housing at a side of said front room of said spool, and communicating said front room of said spool to an outlet of said housing;
   a rod provided as coaxially and bodily with said spool, passing through said opening with a clearance and providing a metering orifice between said opening;
   a communicating path passing through said rod in axial direction and providing a communicating path between said front room of said spool and said outlet of said housing; and
   a relief pressure mechanism received in said spool, releasing high pressure in rear room of said spool to said bypass path and protecting said oil pump from overload; wherein
   said relief pressure mechanism is comprising a relief pressure valve casing and a valve body elastically forced to a seat valve face of a seat valve member provided on said relief pressure valve casing;
   said relief pressure mechanism is assembled in advance as a relief pressure valve sub-assembly;
   a front section of opposite side of said seat valve member provided on said relief pressure valve casing is press fitted to a press fitting hole opening to said rear room of said spool so that a receiving room of said valve body in said relief pressure valve casing communicates to said bypass path; and
   said communicating path communicates to said rear room of said spool through outside of said relief pressure valve sub-assembly.

2. A flow control apparatus according to claim 1, wherein
   a receiving hole whose outer diameter is larger than outer diameter of said relief pressure valve casing at side of said rear room of said spool;
   said press fitting hole is provided on center of bottom face of said receiving hole;
   a cylindrical room is provided between said receiving hole and said relief pressure valve casing of said relief pressure valve sub-assembly and at least a part of said relief pressure valve sub-assembly is received in said receiving room; and
   said cylindrical room is used as a part of a path between said communicating path and said rear room of said spool.

3. A flow control apparatus according to claim 2, wherein said communicating path and said cylindrical room are communicating via a communicating groove provided on outer circumference of front section of said relief pressure valve casing press fitted to said press fitting hole of said spool.

4. A flow control apparatus according to claim 3, wherein said communicating path and said cylindrical room are communicating via a path provided in said spool.

5. A flow control apparatus according to claim 1, wherein a recess portion whose outer diameter is smaller than outer diameter of said spool is provided on outer circumference of said spool slidably inserted into said flow control valve hole in an area in axial direction of at least press fitting of said relief pressure valve sub-assembly.

6. A flow control apparatus according to claim 1, wherein a front section said relief pressure valve casing has a smaller outer diameter than outer diameter of other portion of said relief pressure valve casing.

* * * * *